Patented June 1, 1926.

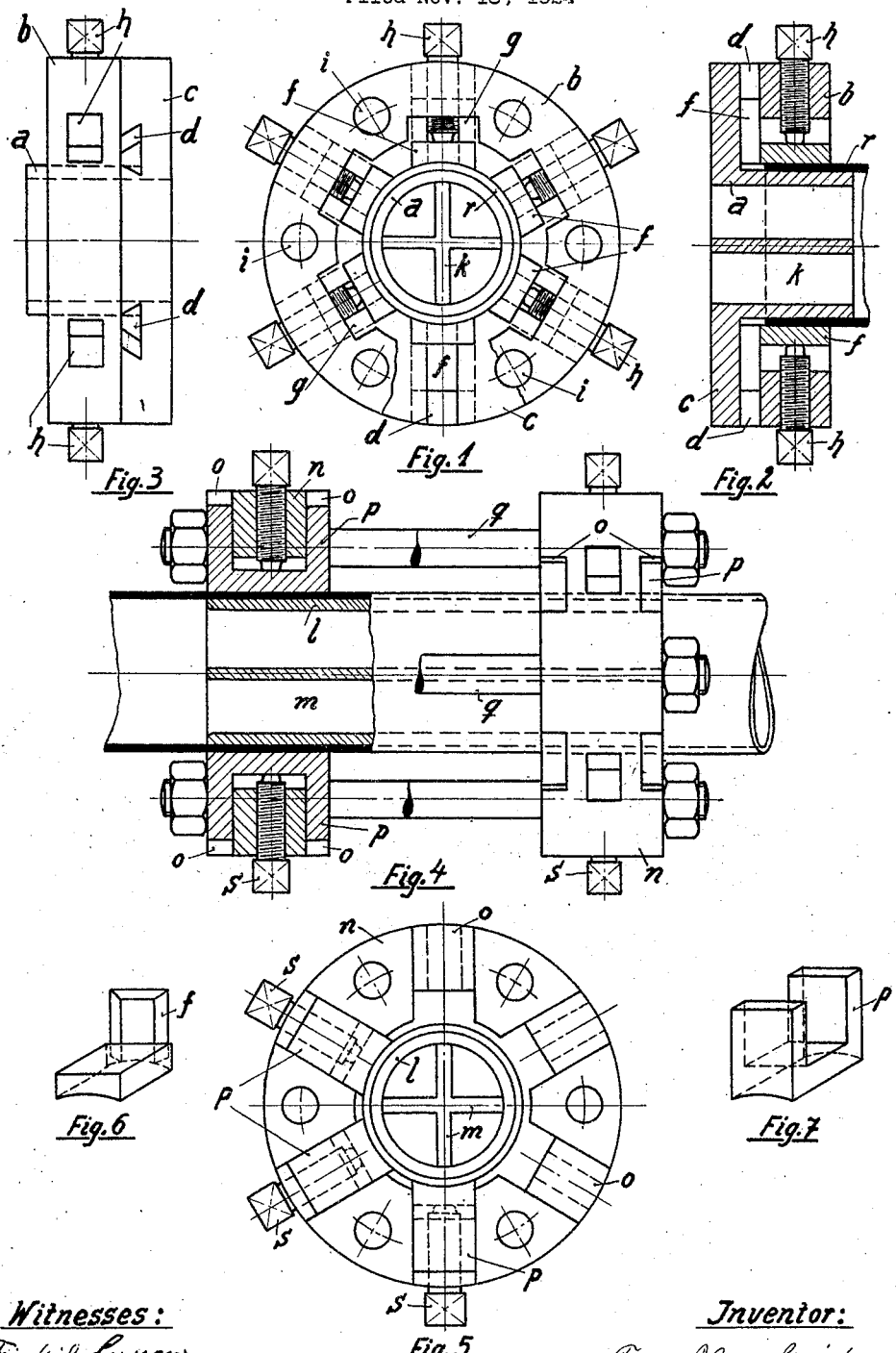

1,587,251

UNITED STATES PATENT OFFICE.

FRANZ XAVER STREICHER, OF HAMBURG, GERMANY.

INTERCHANGEABLE PIPE FLANGE.

Application filed November 18, 1924, Serial No. 750,696, and in Germany March 28, 1924.

The difficulties connected with the reconnecting of two pipe ends after fracture, the packing of a crack or the re-mounting of a pipe flange which has been torn off are the reasons for the invention of the interchangeable pipe flange. This flange can be fixed without great difficulties, without screwing on, soldering or the like at any point of a pipe in order either to serve as substitute for a torn off flange, or to be fixed at either side of a pipe fracture or crack for re-connecting or tightly packing the damaged pipe.

According to this invention the flange is fixed on the pipe by pressing the pipe wall, by means of clamping jaws, on a tubular connecting piece fixed on the flange and inserted into the pipe or, when the pipe has thick walls, the flange is directly clamped on the pipe.

Two forms of construction of interchangeable flanges according to the invention are illustrated, by way of example, on the accompanying drawing, in which:

Figs. 1, 2 and 3 show an end flange respectively in front elevation, side elevation and longitudinal section.

Figs. 4 and 5 shown a flange which specially is designed for the packing of fractured or cracked pipes.

Figs. 6 and 7 show in perspective view clamping jaws of two different forms of construction.

Referring to Figs. 1 to 3 the flange consists mainly of two parts: the tubular connecting piece $a$ and the spring ring $b$. The tubular connecting piece $a$ has a flange $c$ and further six guide grooves $d$ of dovetailed cross section extending in radial directions in which the angular clamping jaws $f$ (Fig. 6) are movable. The spring ring $b$ which has recesses $g$ (designed to guide the clamping jaws $f$) and tightening screws $h$ is not connected at all with the tubular connecting piece $a$. Only after this spring ring $b$ has been put on the pipe $r$ and after the tubular connecting piece $a$, around which packing material is wound, has been inserted into the pipe a connection of the two elements is effected by means of screw bolts inserted through holes $i$ provided in both elements. The clamping jaws $f$ are then tightened by means of the tightening screws $h$. In order that the tubular connecting piece $a$ be sufficiently resistant against this pressure the passage is strengthened by a rib-cross $k$.

By means of the flanges shown in Figs. 4 and 5 which are to be mounted not on the end but on any point of a pipe conduit, for instance at a point of fracture, the tubular connecting piece $a$ shown in Figs. 1–3 can evidently not be used. For this piece $a$ a simple pipe $l$ is substituted which has also a rib-cross $m$. As there is no flange on the pipe-piece the clamping jaws must be guided in another manner as described above. This guiding is effected exclusively by the spring ring $n$ of modified construction. This spring ring $n$ possesses much greater strength than the spring ring $b$ and has also guide grooves $o$ extending in radial directions and designed to guide the clamping jaws $p$ which, as shown in Fig. 7, are U-shaped and inserted from the inside. The manner of fixing these flanges is the same as described with reference to Figs. 1 to 3.

The two flanges are first put on whereupon the pipe-piece $l$ is inserted and the approximate position of the flanges is determined by the screw bolts $q$. The jaws $p$ are tightened by means of the screws $s$ whereupon the screws $g$ are screwed home. In this case the pipe is also clamped on the pipe-piece $l$ by means of the clamping jaws $p$ while in the first mentioned form of construction it is clamped on the tubular connecting piece $a$. This will however be possible only with the pipes having thin walls. On pipes with thicker walls the flange $n$ may be used directly as end flange and the flange shown in Figs. 1 to 3 may be altered accordingly.

The construction of the flange and of the single elements may differ from the construction shown and above described, provided they do not depart from the idea of the invention.

I claim:—

An interchangeable pipe flange consisting of a tubular connecting piece to be inserted into the pipe, a rib-cross strengthening said tubular connecting piece, a flange of said tubular connecting piece having radial guide grooves, clamping jaws in said guide grooves, a spring ring having recesses for said clamping jaws, tightening screws for tightening said clamping jaws, and screws in the flange of said tubular connecting piece for connecting said spring ring with said tubular connecting piece.

In testimony whereof I affix my signature.

FRANZ XAVER STREICHER.